(12) United States Patent
Dorris (10) Patent No.: US 12,240,416 B2
(45) Date of Patent: Mar. 4, 2025

(54) SEAT BASED ITEM RESTRAINT SYSTEM

(71) Applicant: GM Global Technology Operations LLC, Detroit, MI (US)

(72) Inventor: James Theodore Dorris, Tampa, FL (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 265 days.

(21) Appl. No.: 17/973,925

(22) Filed: Oct. 26, 2022

(65) Prior Publication Data

US 2024/0140319 A1 May 2, 2024

(51) Int. Cl.
*B60R 7/04* (2006.01)

(52) U.S. Cl.
CPC .................... *B60R 7/043* (2013.01)

(58) Field of Classification Search
CPC ............ B60R 7/043; B60R 7/10; B60R 7/005
USPC ........................ 297/188.06, 188.07
See application file for complete search history.

(56) References Cited

U.S. PATENT DOCUMENTS

| | | | | |
|---|---|---|---|---|
| 2,390,257 A * | 12/1945 | Jahn | ...................... | A47G 25/065 248/294.1 |
| 4,311,339 A * | 1/1982 | Heath | ..................... | B60N 2/286 297/DIG. 2 |
| 4,466,659 A * | 8/1984 | Carpentier | ............... | A47C 7/70 224/318 |
| 5,727,842 A * | 3/1998 | O'Neil | ................. | B60N 2/2839 248/102 |
| 5,733,000 A * | 3/1998 | Stump | ...................... | A47C 4/52 297/188.06 |
| 6,109,579 A * | 8/2000 | Huang | ..................... | B60R 7/10 248/304 |
| 6,742,837 B1 * | 6/2004 | Alexander | ............. | B60R 7/043 297/188.21 |
| 6,971,716 B2 * | 12/2005 | DePaulis | .................. | B60N 2/60 297/229 |
| 7,614,689 B2 * | 11/2009 | Fowler | .................... | B60R 22/00 297/487 |
| 9,731,657 B1 * | 8/2017 | Salter | ........................ | B60R 7/10 |
| 10,363,880 B1 * | 7/2019 | Miranda Nieto | ......... | B60R 7/10 |
| 2011/0095156 A1 * | 4/2011 | Myers | ....................... | B60R 7/10 296/1.07 |
| 2016/0096455 A1 * | 4/2016 | Zimmerman | ............ | B60N 2/90 297/463.1 |
| 2016/0123529 A1 * | 5/2016 | Ogawa | .................... | F16B 5/126 248/222.52 |
| 2017/0217378 A1 * | 8/2017 | Rodriguez | ............. | B60R 11/00 |
| 2020/0247304 A1 * | 8/2020 | Fowler | .................. | B60P 7/0823 |

FOREIGN PATENT DOCUMENTS

GB    2526776 A * 12/2015 ............. B60N 3/108

\* cited by examiner

*Primary Examiner* — David R Dunn
*Assistant Examiner* — Tania Abraham
(74) *Attorney, Agent, or Firm* — CANTOR COLBURN LLP (57) ABSTRACT

A vehicle seat includes a seat base and a seat back connected to the seat base. The seat back includes a first side bolster including a first lateral surface and a second side bolster having a second lateral surface. An item restraint system including a selectively deployable restraint element is mounted adjacent to the first lateral surface and a selectively positionable hook is mounted to the second lateral surface.

20 Claims, 8 Drawing Sheets

SEAT BASED ITEM RESTRAINT SYSTEM

INTRODUCTION

The subject disclosure relates to the art of vehicles and, more particularly, to a seat based item restraint system for a vehicle.

People typically place items on a vehicle seat for transport. Brief cases, shopping bags, boxed items, and the like, are often rested on a vehicle seat for a trip home, to the office, or such. Often time, the items may slide off of the seat onto the floor or, more annoyingly, between seats. There have been a number of solutions to keep items on a seat. People use seat belts, rope, bungee cords, and the like to secure items on a seat. While effective, each solution includes drawbacks. Many items are not easy to secure with a seatbelt. Rope, bungee cords, and the like require pre-planning. Further, seat organizers may take up significant space in the vehicle when not in use. Accordingly, it is desirable to provide a vehicle seat with a system for readily securing items for transport.

SUMMARY

A vehicle seat, in accordance with a non-limiting example, includes a seat base and a seat back connected to the seat base. The seat back includes a first side bolster including a first lateral surface and a second side bolster having a second lateral surface. An item restraint system including a selectively deployable restraint element is mounted adjacent to the first lateral surface and a selectively positionable hook is mounted to the second lateral surface.

In addition to one or more of the features described herein the selectively deployable restraint element comprises a retractable cable mechanism.

In addition to one or more of the features described herein the selectively positionable hook includes a plurality of selectively positionable hooks mounted to the second lateral surface.

In addition to one or more of the features described herein the plurality of selectively positionable hooks includes a first plurality of selectively positionable hooks arranged on the first lateral surface and a second plurality of selectively positionable hooks arranged on the second lateral surface.

In addition to one or more of the features described herein the selectively positionable hook includes a housing including a recess.

In addition to one or more of the features described herein the housing includes an opening defined by an outer edge including an indentation, the selectively positionable hook being arranged in the opening.

In addition to one or more of the features described herein the selectively positionable hook includes a hook support rotatably connected to the outer edge, the hook support including a first surface, a second surface that is opposite the first surface, and a peripheral outer edge supporting a ball detent, a hook member mounted to one of the first surface and the second surface, the hook support being rotatable between a first position wherein the hook member is received in the recess and a second position wherein the hook member is exposed at the second lateral surface.

In addition to one or more of the features described herein the selectively positionable hook includes a first hook member mounted to the first surface and a second hook member mounted to the second surface.

In addition to one or more of the features described herein the selectively positionable hook includes a spring allowing the selectively positionable hook to be pulled away from the housing and rotated.

In addition to one or more of the features described herein the selectively positionable hook includes a support post extending into the recess, the support post including a spring, the selectively positionable hook being arranged in a first position wherein the spring forces the support post into a travel limiter and a second position wherein the spring forces the support post outwardly to deploy the selectively positionable hook.

A vehicle, in accordance with a non-limiting example, includes a body defining a passenger compartment and a seat arranged in the passenger compartment. The seat includes a seat base and a seat back connected to the seat base. The seat back includes a first side bolster including a first lateral surface and a second side bolster having a second lateral surface. An item restraint system including a selectively deployable restraint element is mounted adjacent the first lateral surface and a selectively positionable hook mounted to the second lateral surface.

In addition to one or more of the features described herein the selectively deployable restraint element comprises a retractable cable mechanism.

In addition to one or more of the features described herein the selectively positionable hook includes a plurality of selectively positionable hooks mounted to the second lateral surface.

In addition to one or more of the features described herein the plurality of selectively positionable hooks includes a first plurality of selectively positionable hooks arranged on the first lateral surface and a second plurality of selectively positionable hooks arranged on the second lateral surface.

In addition to one or more of the features described herein the selectively positionable hook includes a housing including a recess.

In addition to one or more of the features described herein the housing includes an opening defined by an outer edge including an indentation, the selectively positionable hook being arranged in the opening.

In addition to one or more of the features described herein the selectively positionable hook includes a hook support rotatably connected to the outer edge, the hook support including a first surface, a second surface that is opposite the first surface, and a peripheral outer edge supporting a ball detent, a hook member mounted to one of the first surface and the second surface, the hook support being rotatable between a first position wherein the hook member is received in the recess and a second position wherein the hook member is exposed at the second lateral surface.

In addition to one or more of the features described herein the selectively positionable hook includes a first hook member mounted to the first surface and a second hook member mounted to the second surface.

In addition to one or more of the features described herein the selectively positionable hook includes a spring allowing the selectively positionable hook to be pulled away from the housing and rotated.

In addition to one or more of the features described herein the selectively positionable hook includes a support post extending into the recess, the support post including a spring, the selectively positionable hook being arranged in a first position wherein the spring forces the support post into a travel limiter and a second position wherein the spring forces the support post outwardly to deploy the selectively positionable hook.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
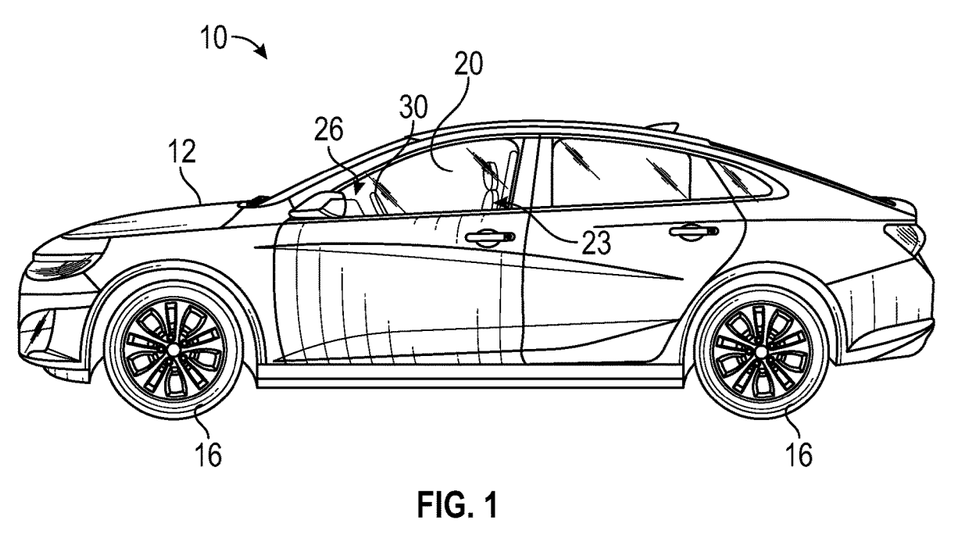
FIG. 1 is a left side view of a vehicle including a seat having an item restraint system, in accordance with a non-limiting example.

A vehicle, in accordance with a non-limiting example, is indicated generally at 10 in FIG. 1. Vehicle 10 includes a body 12 supported on a plurality of wheels 16. At least two of the plurality of wheels 16 are steerable. That is, changing a position of two of the plurality of wheels 16 relative to body 12 will cause vehicle 10 to change direction. In the non-limiting example shown, both front wheels (not separately labeled) of the plurality of wheels 16 are steerable wheels. Body 12 defines, in part, a passenger compartment 20 having seats 23 positioned behind a dashboard 26. A steering control system 30 is arranged between seats 23 and dashboard 26. Steering control system 30 is operated to control the orientation of the steerable wheels.

Figure 2:
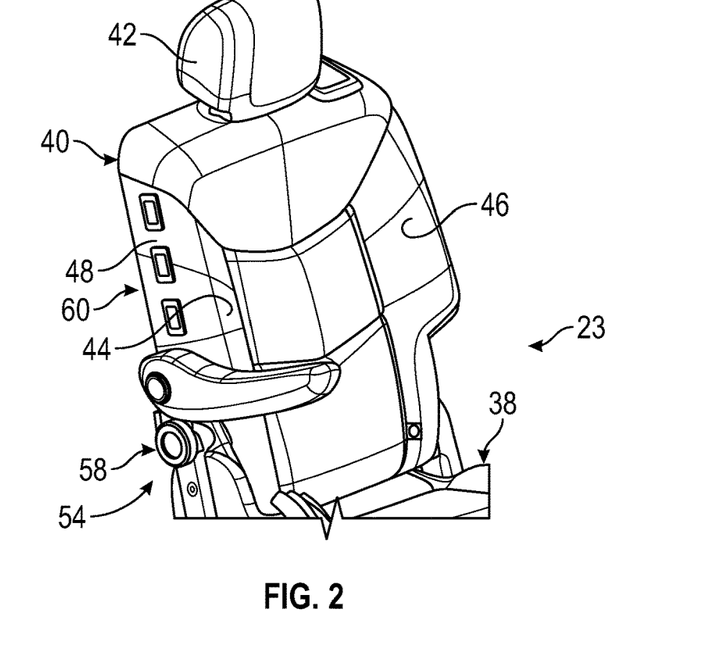
FIG. 2 is an upper right perspective view of a vehicle seat including the item restraint system of FIG. 1, in accordance with a non-limiting example.
Figure 3:
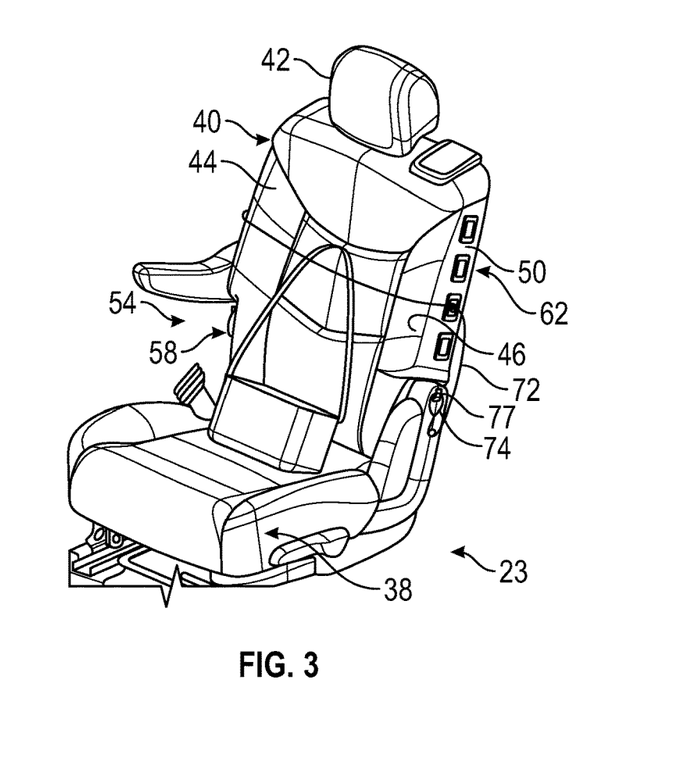
FIG. 3 is an upper left perspective view of the vehicle seat of FIG. 2, in accordance with a non-limiting example.

Referring to FIGS. 2 and 3, seat 23 includes a seat base 38 and a seat back 40. Seat back 40 includes a head rest 42, a first side bolster 44 and a second side bolster 46. First side bolster 44 includes a first lateral surface 48 (FIG. 2) and second side bolster 46 includes a second lateral surface 50 (FIG. 3). In accordance with a non-limiting example, seat back 40 includes an item restraint system 54 including a selectively deployable restraint element 58 arranged at first lateral surface 48, a first plurality of selectively positionable hooks 60 arranged on first lateral surface 48 and a second plurality of selectively positionable hooks 62 arranged on second lateral surface 50. The term "selectively positionable" should be understood that hooks 60 may be rotated or shifted in order to promote additional attachment options as will be detailed more fully herein.

Figure 4:
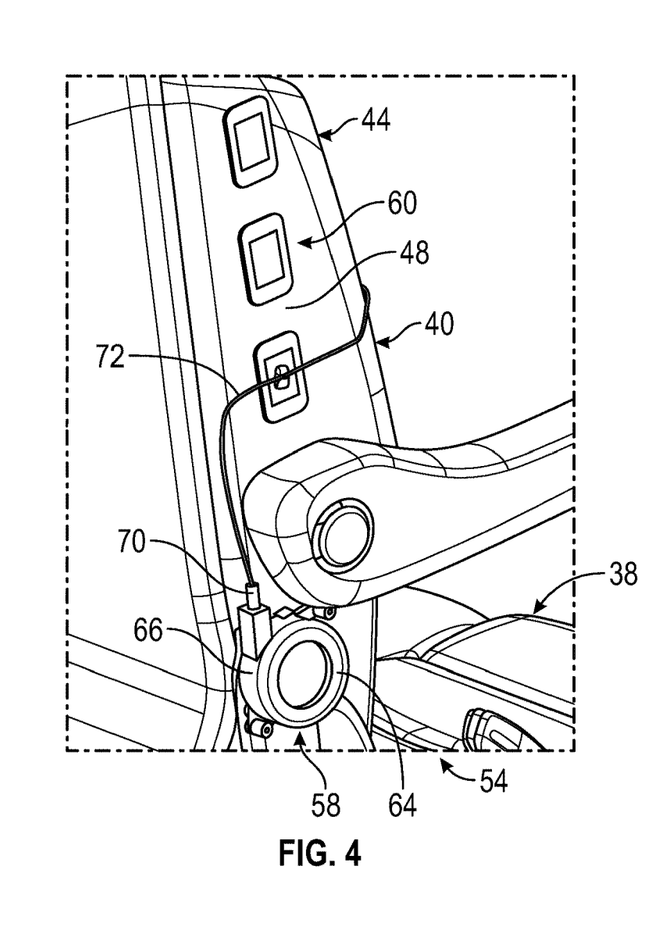
FIG. 4 is a partial right side perspective view of a seat back including a retractable cable mechanism of the item restraint system, in accordance with a non-limiting example.
Figure 5:
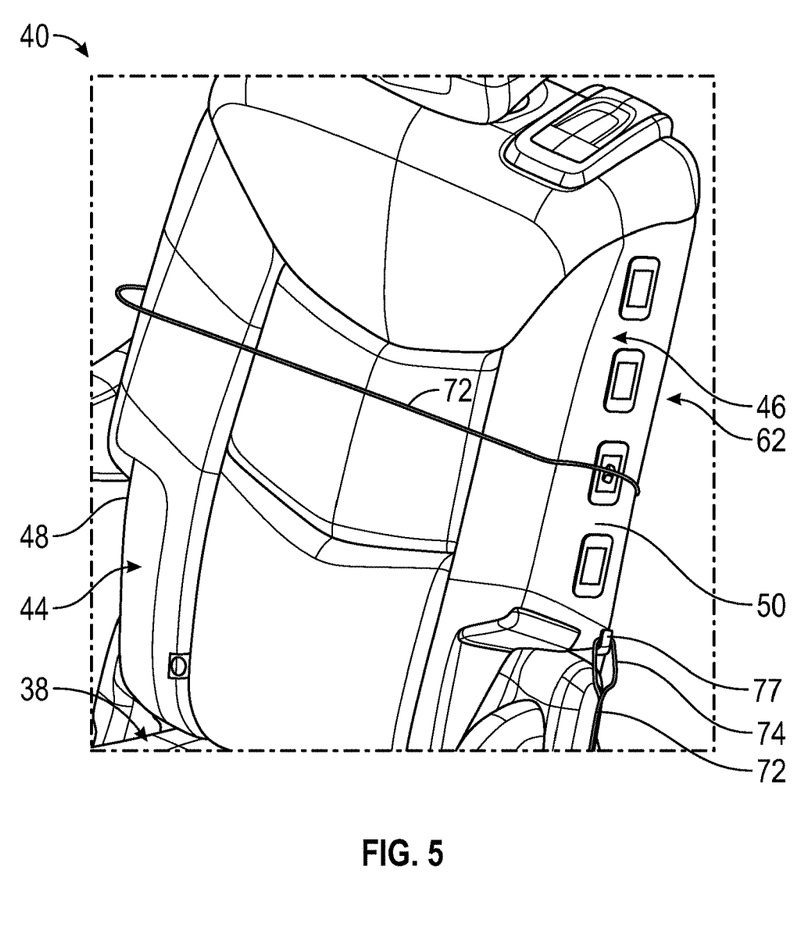
FIG. 5 is a partial left side perspective view of the seat back of FIG. 4 showing a cable from the retractable cable mechanism wrapping around selectively positionable hooks of the item restraint system, in accordance with a non-limiting example.
Figure 6:
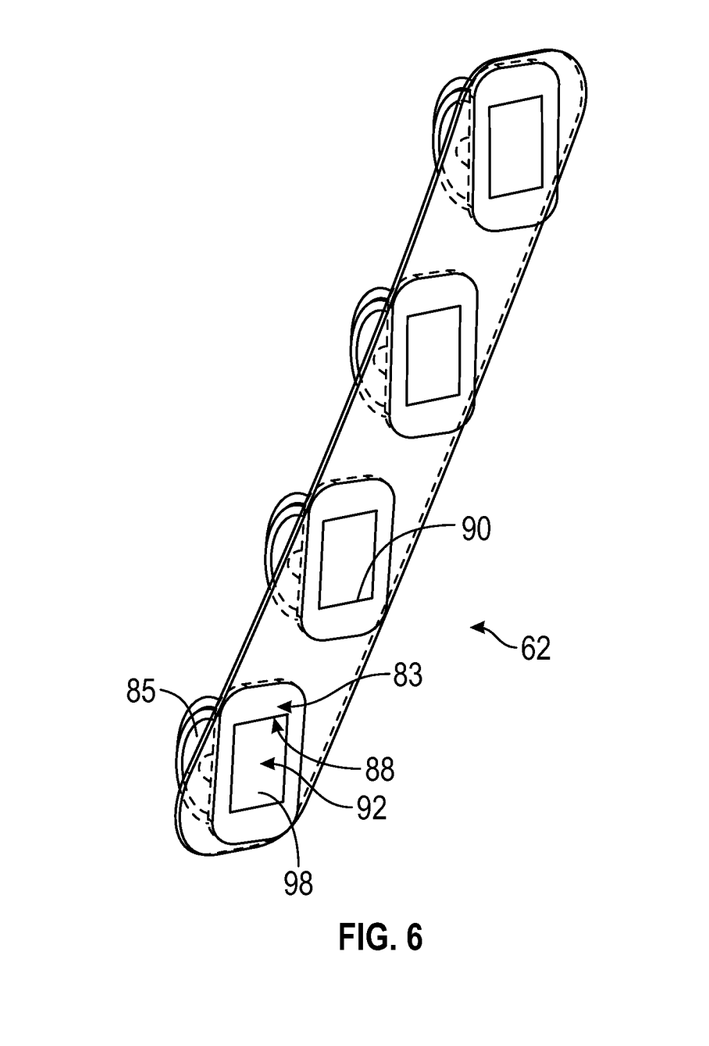
FIG. 6 is a perspective view of the selectively positionable hooks in a non-deployed configuration, in accordance with a non-limiting example.

In accordance with a non-limiting example, selectively deployable restraint element 58 takes the form of a retractable cable mechanism 64 (FIG. 4) including a housing 66 within which is arranged a cable reel (not shown). Housing 66 includes a cable outlet 70 through which passes a cable 72 having a loop or latching end 74 (FIG. 5). Latching end 74 may extend about one or more of the first plurality of selectively positionable hooks 60, the second plurality of selectively positionable hooks 62, and then engaged with a hook keeper 77. Of course, it should be understood that latching end 77 may be engaged with any one of the first plurality of selectively positionable hooks 60 and the second plurality of selectively positionable hooks 62. Also, while cable 72 is shown terminating in a loop that engages with hook on the seat, cable 72 may terminate at a hook that engages a loop mounted to the seat. Further, it should be understood that the cable may be routed around the front or the back of the seat. It may be routed through or around items, or the latching end may be engaged directly with the item of interest. Additionally, items may be supported on the hooks themselves. Further, it should be understood that the cable may be routed to or about an adjacent seat.

Figure 7:
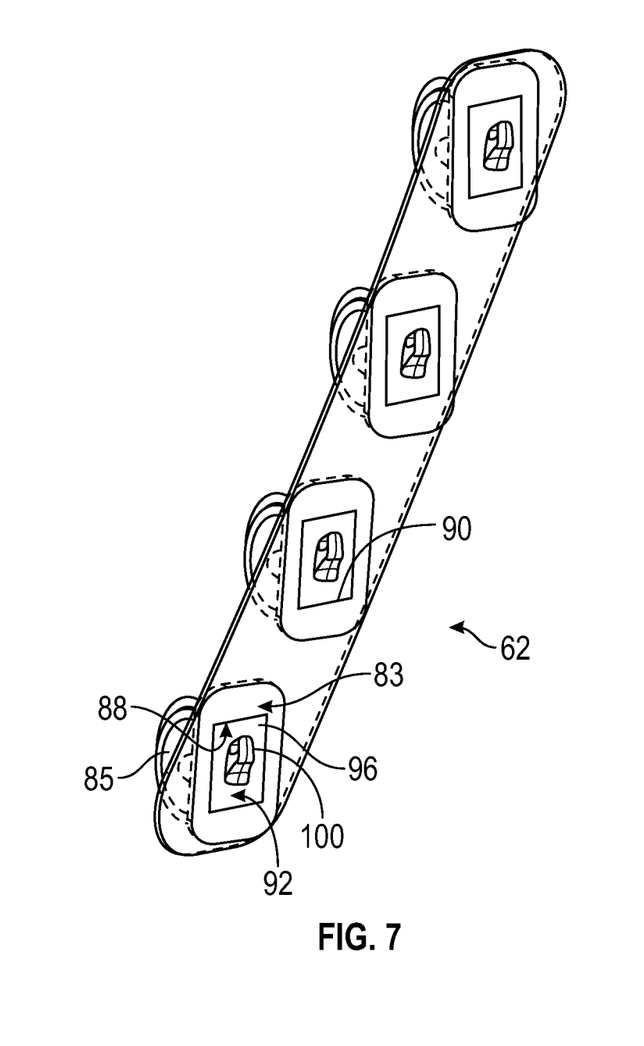
FIG. 7 is a perspective view of the selectively positionable hooks in a deployed configuration, in accordance with a non-limiting example.
Figure 8:
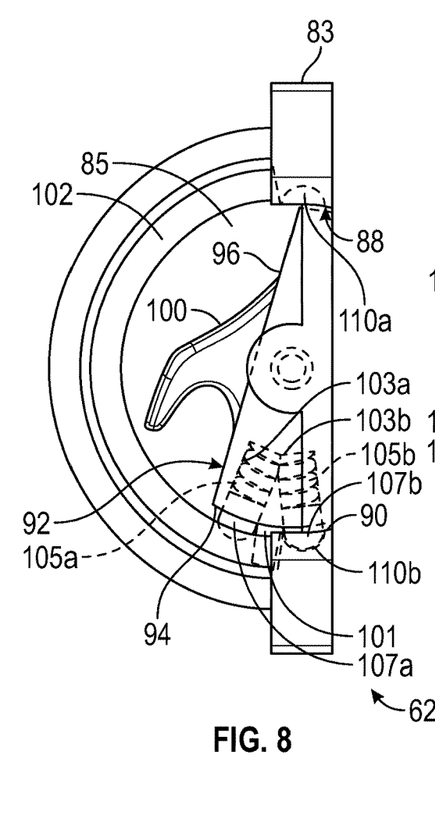
FIG. 8 is a side view of one of the selectively positionable hooks in the first configuration, in accordance with a non-limiting example.
Figure 9:
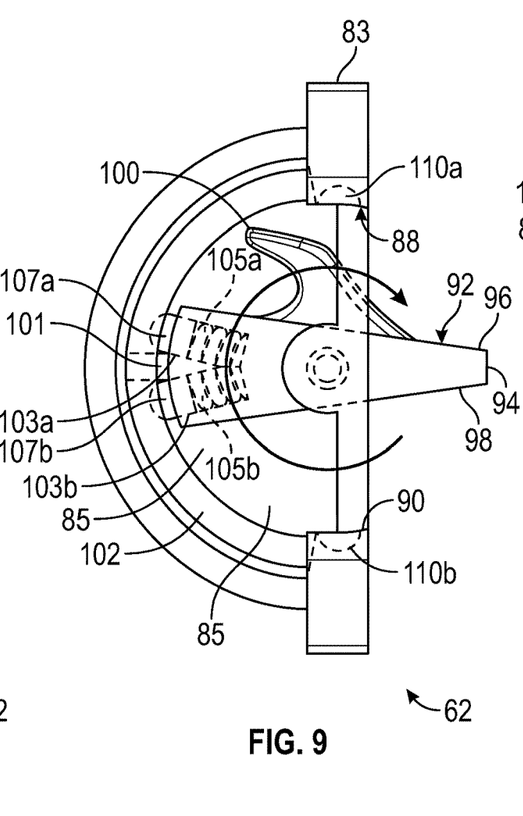
FIG. 9 is a side view of the one of the selectively positionable hooks of FIG. 8 transitioning to the second configuration, in accordance with a non-limiting example.
Figure 10:
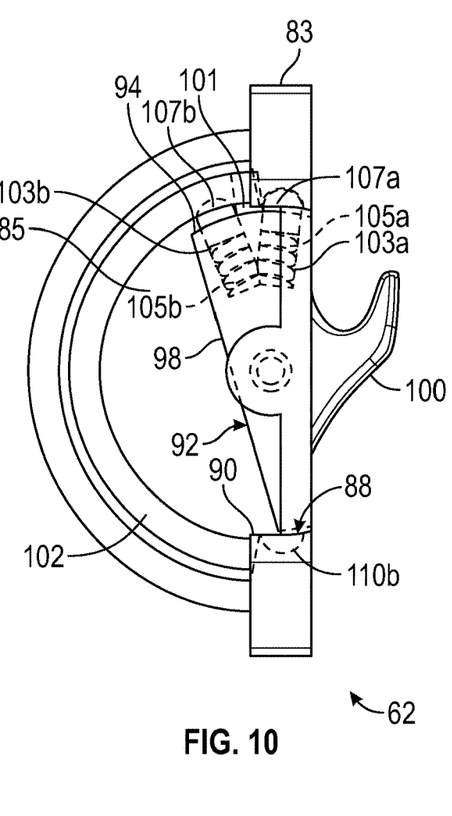
FIG. 10 is a side view of the one of the selectively positionable hooks of FIG. 9 in the second configuration, in accordance with a non-limiting example.

Reference will now follow to FIGS. 6, 7, 8, 9, and 10 in describing second plurality of selectively positionable hooks 62 with an understanding that first plurality of selectively positionable hooks 60 includes similar structure. Second plurality of selectively positionable hooks 62 may be arranged in a stowed configuration (FIGS. 6 and 8) and a deployed configuration (FIGS. 7 and 10). Each of the second plurality of selectively positionable hooks 62 includes a housing 83 having a recess 85 including an opening 88 defined by an outer edge 90. A hook support 92 is rotatably mounted to outer edge 90. Hook support 92 includes a peripheral edge 94 defining a first surface 96 and a second surface 98. A hook member 100 is shown supported on first surface 96.

In a non-limiting example, hook support 92 includes a guide member 101 that projects from peripheral edge 94. Guide member 101 rides in a guide track 102 as hook support 92 transitions between the stowed and deployed configurations (FIG. 9). Peripheral edge 94 also includes two passages 103a and 103b that each house a spring 105 and a ball detent 107. The first ball detent 107a engages with a first indentation 110a or the second ball detent 107b engages with a second indentation 110b formed in outer edge 90. That is, when hook support 92 is in the stowed configuration (FIG. 8), second ball detent 107b engages with second indentation 110b. When hook support 92 is arranged in the deployed configuration (FIG. 10), first ball detent 107a engages with first indentation 110a. In this manner, hook support 92 is retained in place, is prevented from rotating beyond the desired configuration, but can be easily transitioned when force is applied.

Figures 11, 12:
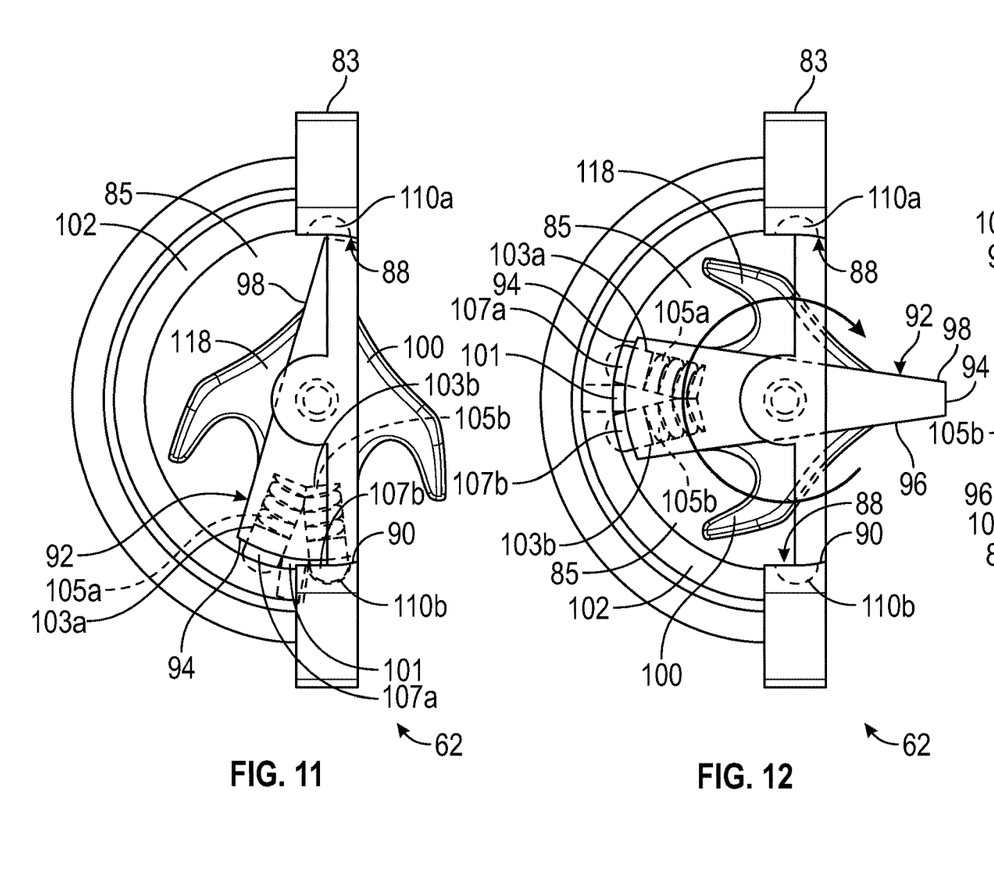
FIG. 11 is a plan view of a dual selectively positionable hook in the first configuration, in accordance with a non-limiting example.
FIG. 12 is a side view of the dual selectively positionable hook of FIG. 11 transitioning to the second configuration, in accordance with a non-limiting example.
Figure 13:
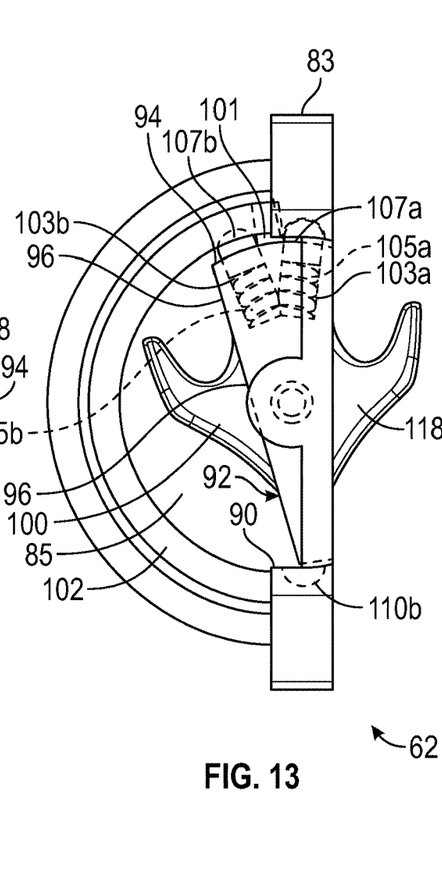
FIG. 13 is a side view of the dual selectively positionable hook of FIG. 12 in the second configuration, in accordance with a non-limiting example.

Referring to FIGS. 11, 12, and 13, hook support 92 may support hook member 100 on first surface 96 and another hook 118 on second surface 98. Hook member 100 may be a forward facing hook, (e.g., a hook that faces toward a front of vehicle 10) and hook 118 may be a rearward facing hook, (e.g., a hook that faces toward a rear of vehicle 10). Hook 118 may also face upwardly or downwardly. By adjusting the position of selectively positionable hook 62 by rotating hook support 92 from a first or forward facing hook configuration (FIG. 11), through an intermediate position (FIG. 12) to a second or rearward facing hook configuration (FIG. 13), a user is provided with more options for routing cable 72 about seat back 40.

Figure 14:
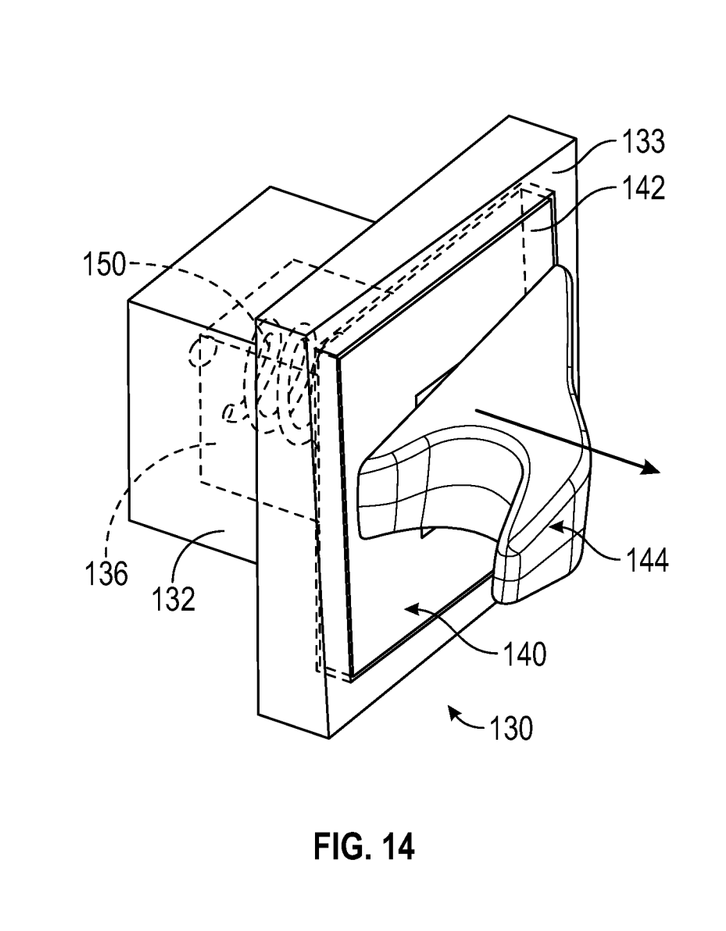
FIG. 14 is a perspective view of a hook element in a first configuration, in accordance with another non-limiting example.
Figure 15:
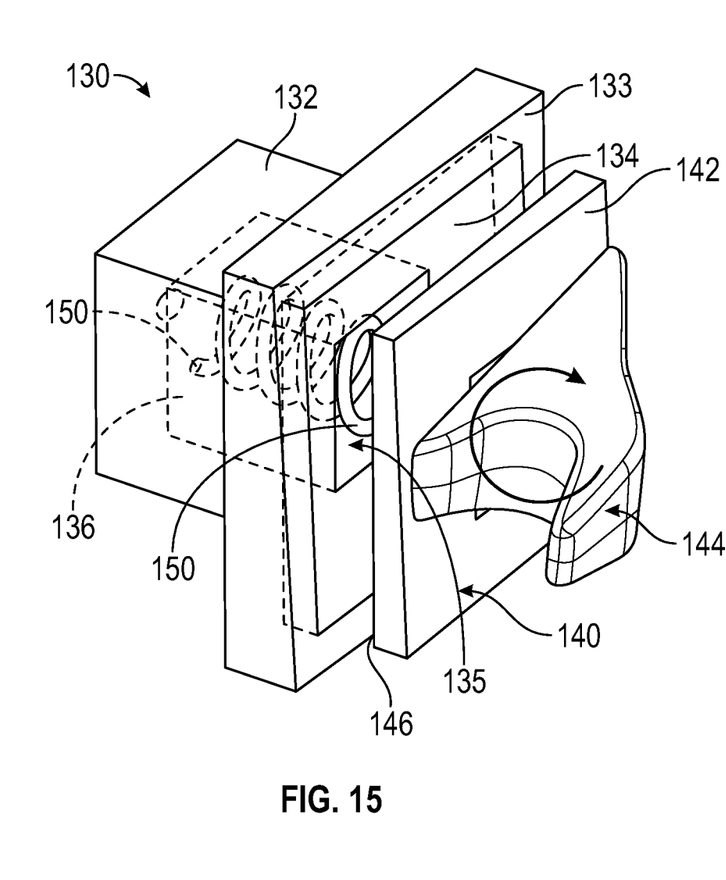
FIG. 15 is a perspective view of the hook element of FIG. 14 preparing to rotate to a second configuration, in accordance with a non-limiting example.

Reference will now follow to FIGS. 14 and 15 in describing a selectively positionable hook 130 in accordance with another non-limiting example. Selectively positionable hook 130 includes a housing 132 having an outer surface 133 and a first recess 134. Housing 132 includes an opening 135 that exposes a second recess 136. A hook support 140 is arranged over opening 135. Hook support 140 includes a first surface 142 that supports a hook member 144 and a second surface 146 that is opposite first surface 142. A biasing member, shown in the form of a spring 150 is arranged in second recess 136 and connected with second surface 146.

In a non-limiting example, hook member 144 may be in a forward facing configuration (FIG. 14) with hook support 140 resting in first recess 134 such that first surface 142 is coplanar with outer surface 133. Hook member 144 may be lifted from housing 132 (FIG. 15) such that hook support 140 clears first recess 134 and rotated to be in a rearward facing configuration (not shown) or face upwardly or downwardly in order to enhance cabling options for securing an item.

Figure 16:
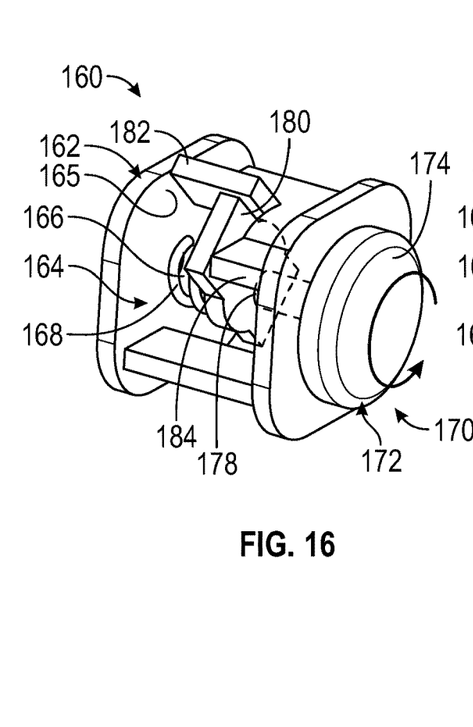
FIG. 16 is a perspective view of a hook element in a non-deployed configuration, in accordance with yet another non-limiting example.
Figure 17:
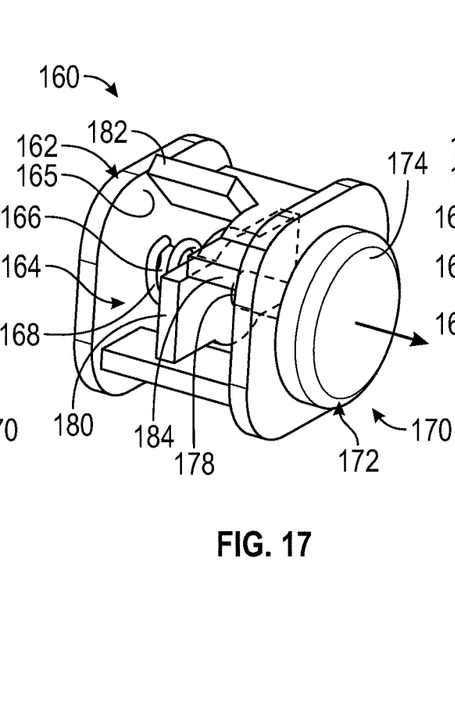
FIG. 17 is a perspective view of the hook element of FIG. 16 preparing to deploy, in accordance with a non-limiting example.
Figure 18:
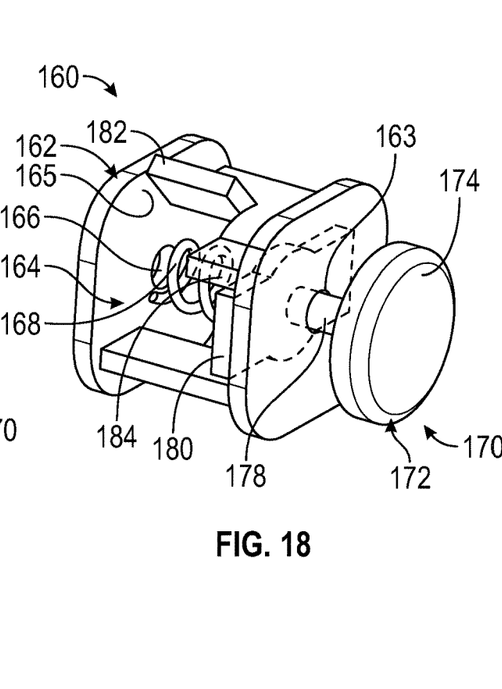
FIG. 18 is a perspective view of the hook element of FIG. 17 in a deployed configuration, in accordance with a non-limiting example.

Reference will now follow to FIGS. 16, 17, and 18 in describing a selectively positionable hook 160 in accordance with another non-limiting example. Selectively positionable hook 160 includes a housing 162 having an opening 163 (FIG. 18) that leads to a recess 164 having a base 165. Base 165 includes a spring support 166 to which is mounted a coil spring 168. A hook member 170 is supported at housing 162. Hook member 170 includes a hook end 172 shown as a disc 174 and a support post 178 that extends through opening 163 into recess 164. Support post 178 includes a base member 180 that engages coil spring 168.

In a non-limiting example, hook member 170 may be in a retracted configuration (FIG. 16) with base member 180 resting against a first travel limiter 182 and being urged, by coil spring 168, against a second travel limiter 184 arranged in recess 164. First travel limiter 182 constrains rotational movement of hook member 170 and second travel limiter 184 constrains outward movement of hook member 170. Hook member 170 may be rotated to move base member 180 in a direction away from first travel limiter 182 and to be clear of second travel limiter 184 as shown in FIG. 17. At this point, coil spring 168 acts on base member 180 forcing hook end 172 away from housing 162.

At this point, it should be understood that the item restraint system in accordance with the present disclosure provides users with a flexible system that can be used to secure a wide range of items in a vehicle seat. By integrating the item restraint system into the seat, the user need not carry a wide array of devices, straps, bungee cords, and the like to secure items or to engineer connection points for restraints.

The terms "a" and "an" do not denote a limitation of quantity, but rather denote the presence of at least one of the referenced items. The term "or" means "and/or" unless clearly indicated otherwise by context. Reference throughout the specification to "an aspect" means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A vehicle seat comprising:
   a seat base;
   a seat back connected to the seat base, the seat back including a first side bolster including a first lateral surface and a second side bolster having a second lateral surface; and
   an item restraint system including a selectively deployable restraint element mounted adjacent to the first lateral surface and a selectively positionable hook mounted to the second lateral surface,
   wherein the selectively deployable restraint element comprises a retractable cable mechanism,
   wherein the selectively positionable hook includes a plurality of selectively positionable hooks mounted to the second lateral surface, and wherein the plurality of selectively positionable hooks includes a first plurality of selectively positionable hooks arranged on the first lateral surface and a second plurality of selectively positionable hooks arranged on the second lateral surface.

2. The vehicle seat according to claim 1, wherein the selectively positionable hook includes a housing including a recess.

3. The vehicle seat according to claim 2, wherein the housing includes an opening defined by an outer edge including an indentation, the selectively positionable hook being arranged in the opening.

4. The vehicle seat according to claim 3, wherein the selectively positionable hook includes a hook support rotatably connected to the outer edge, the hook support including a first surface, a second surface that is opposite the first surface, and a peripheral outer edge supporting a ball detent, a hook member mounted to one of the first surface and the second surface, the hook support being rotatable between a first position wherein the hook member is received in the recess and a second position wherein the hook member is exposed at the second lateral surface.

5. The vehicle seat according to claim 4, wherein the selectively positionable hook includes a first hook member mounted to the first surface and a second hook member mounted to the second surface.

6. A vehicle comprising:
a body defining a passenger compartment; and
the vehicle seat according to claim 1.

7. The vehicle according to claim 6, wherein the selectively positionable hook includes a housing including a recess.

8. The vehicle according to claim 7, wherein the housing includes an opening defined by an outer edge including an indentation, the selectively positionable hook being arranged in the opening.

9. The vehicle according to claim 8, wherein the selectively positionable hook includes a hook support rotatably connected to the outer edge, the hook support including a first surface, a second surface that is opposite the first surface, and a peripheral outer edge supporting a ball detent, a hook member mounted to one of the first surface and the second surface, the hook support being rotatable between a first position wherein the hook member is received in the recess and a second position wherein the hook member is exposed at the second lateral surface.

10. The vehicle according to claim 9, wherein the selectively positionable hook includes a first hook member mounted to the first surface and a second hook member mounted to the second surface.

11. A vehicle seat comprising:
a seat base;
a seat back connected to the seat base, the seat back including a first side bolster including a first lateral surface and a second side bolster having a second lateral surface; and
an item restraint system including a selectively deployable restraint element mounted adjacent to the first lateral surface and a selectively positionable hook mounted to the second lateral surface
wherein the selectively positionable hook includes a housing including a recess,
wherein the selectively positionable hook includes a spring allowing the selectively positionable hook to be pulled away from the housing and rotated.

12. The vehicle seat according to claim 11, wherein the selectively deployable restraint element comprises a retractable cable mechanism.

13. The vehicle seat according to claim 12, wherein the selectively positionable hook includes a plurality of selectively positionable hooks mounted to the second lateral surface.

14. The vehicle seat according to claim 13, wherein the plurality of selectively positionable hooks includes a first plurality of selectively positionable hooks arranged on the first lateral surface and a second plurality of selectively positionable hooks arranged on the second lateral surface.

15. A vehicle comprising:
a body defining a passenger compartment; and
the vehicle seat according to claim 11.

16. The vehicle according to claim 15, wherein the selectively deployable restraint element comprises a retractable cable mechanism.

17. The vehicle according to claim 16, wherein the selectively positionable hook includes a plurality of selectively positionable hooks mounted to the second lateral surface.

18. The vehicle according to claim 17, wherein the plurality of selectively positionable hooks includes a first plurality of selectively positionable hooks arranged on the first lateral surface and a second plurality of selectively positionable hooks arranged on the second lateral surface.

19. A vehicle seat comprising:
a seat base;
a seat back connected to the seat base, the seat back including a first side bolster including a first lateral surface and a second side bolster having a second lateral surface; and
an item restraint system including a selectively deployable restraint element mounted adjacent to the first lateral surface and a selectively positionable hook mounted to the second lateral surface
wherein the selectively positionable hook includes a housing including a recess,
wherein the selectively positionable hook includes a support post extending into the recess, the support post including a spring, the selectively positionable hook being arranged in a first position wherein the spring forces the support post into a travel limiter and a second position wherein the spring forces the support post outwardly to deploy the selectively positionable hook.

20. A vehicle comprising:
a body defining a passenger compartment; and
the vehicle seat according to claim 19.

* * * * *